March 1, 1949.    L. M. CALDWELL    2,463,240
SLING
Filed March 12, 1945    2 Sheets-Sheet 1

Inventor
Leslie M. Caldwell
Andrew F. Wintercorn
Atty.

March 1, 1949. L. M. CALDWELL 2,463,240
SLING
Filed March 12, 1945 2 Sheets-Sheet 2

Inventor
Leslie M. Caldwell
Andrew F. Wintercorn
Atty.

Patented Mar. 1, 1949

2,463,240

UNITED STATES PATENT OFFICE 2,463,240

SLING

Leslie M. Caldwell, Rockford, Ill.

Application March 12, 1945, Serial No. 582,304

1 Claim. (Cl. 294—1)

This invention relates to slings for use with hoisting equipment generally, and is more particularly concerned with improvements in the self-equalizing and automatically locking type of sling disclosed in my Patent 2,356,147, issued August 22, 1944.

In the sling disclosed in the patent, the pulley wheel is normally free to turn for equalization of the sling but is yieldably mounted so as to yield under load and assume a locked position, so that the cable or chain which has previously adjusted itself cannot shift its position any further and will accordingly hoist the load without danger of tipping. In the construction of my earlier patent I disclosed brake shoe means disposed in the median plane of the pulley wheel and arranged for wedging braking engagement between the flanges thereof. However, that arrangement was objectionable from the standpoint of placing excessive tensile strains upon the flanges, apt to cause breakage, and also from the standpoint of interference of the brake shoes with the cable in the cable type slings to such an extent that I considered it advisable to use the brake shoes to grip the cable for a braking action, this location of the brake shoes being also objectionable in the chain type slings by imposing limitations upon the design of the chain receiving groove in the pulley. It is, therefore, the principal object of my present invention to provide a pulley wheel having the outer marginal portion tapered for frictional engagement between opposed wedge-shaped brake shoes to resist turning of the wheel so long as the same continues to be under load, without interfering with the cable or chain in the manners stated, or giving rise to any danger of breakage of any portion of the rim of the wheel by reason of excessive strain, the present arrangement resulting only in non-destructive compression loading of the rim of the wheel and tensile loading of through-bolts which fasten together the opposed side plates of the sling frame, the parts so loaded being capable of withstanding many times the loads imposed without any danger whatsoever of breakage.

Another object of the invention consists in the provision of simple and economical as well as highly efficient means for guiding the turns of the cable in the cable type sling, so that the cable maintains the same relationship to the side flanges of the pulley wheel in the turning of the wheel for equalization of the sling.

The invention is illustrated in the accompanying drawings, in which—

Similar reference numerals are applied to corresponding parts throughout these views.

Figures 1, 2:
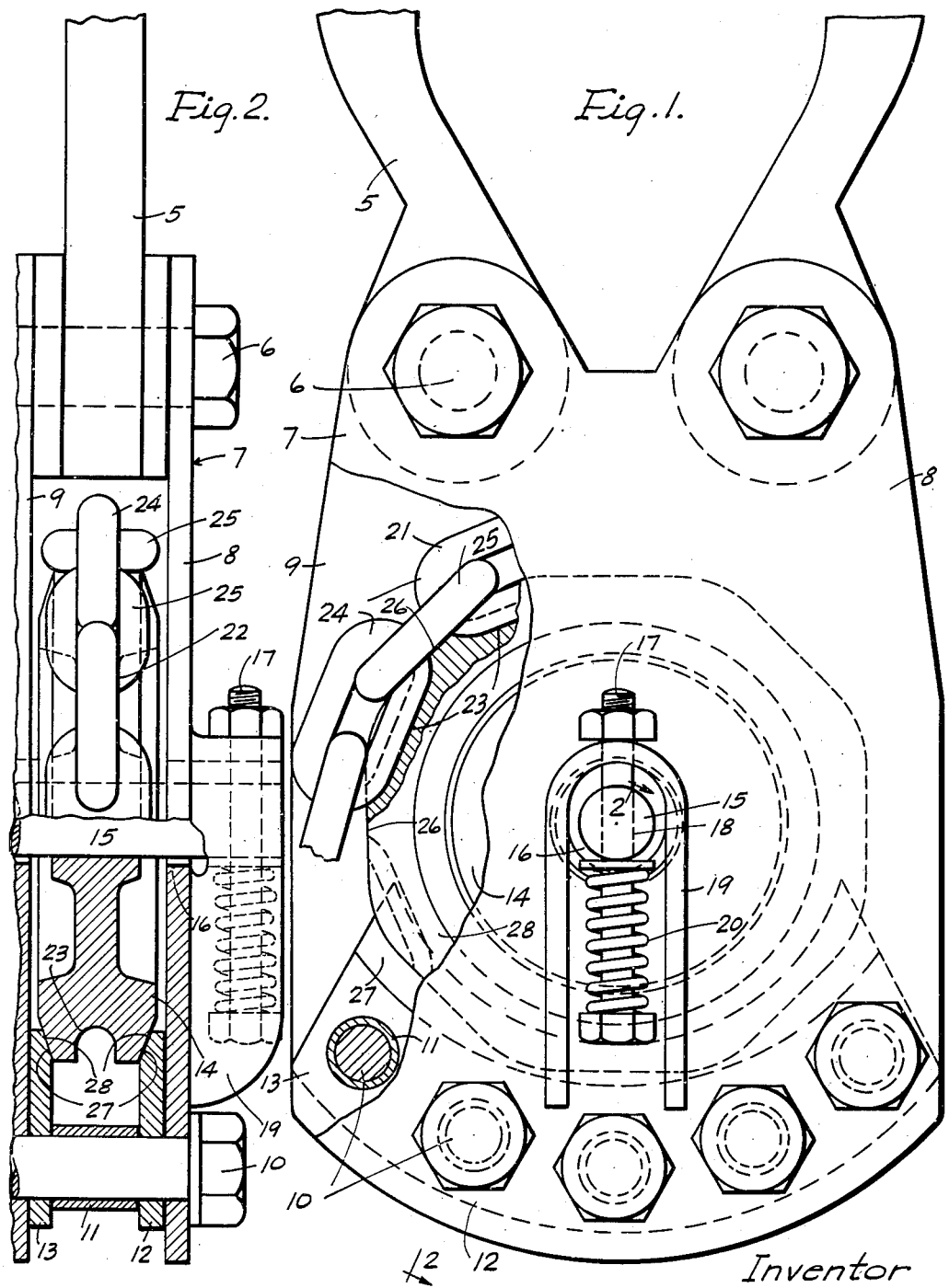
Fig. 1 is a side view of the frame of a sling made in accordance with my invention, the upper portion of the eye-piece being broken away to permit showing the parts on a larger scale, and a portion of one side plate being broken away to better illustrate the relationship of the chain to the pulley wheel.
Fig. 2 is a view of the sling partly in front elevation and partly in section on the line 2—2 of Fig. 1.

Referring first to Figs. 1 and 2, the eye 5 that is adapted to receive the crane hook is attached, as indicated at 6, to the frame 7 of the sling between the side plates 8 and 9. Bolts 10 fasten the lower portions of the side plates together, and have spacers 11 thereon between arcuate brake shoes 12 and 13, so that these shoes are clamped in place against the inner faces of the side plates on opposite sides of the pulley wheel 14. The wheel 14 turns on an axle 15 which extends freely through registering holes 16 in the side plates and is guided for a limited up and down movement on bolts 17 that extend through diametrical holes 18 in the ends of the axle, as clearly appears in Fig. 1. These bolts are suspended in the inverted U-shaped bosses 19 cast integral with the side plates and support coiled compression springs 20 on which the ends of the axle 15 rest for a yieldable mounting of the pulley wheel. In that way the pulley wheel is normally free to turn for equalization of the sling chain 21, but yields under load to assume a locked position in the frame 7, so that the chain 21 which has previously adjusted itself cannot shift its position any further and will accordingly hoist the load without danger of tipping. The peripheral groove 22 in the pulley wheel is notched out at evenly spaced intervals, as indicated at 23, to accommodate the alternate links 24 of the sling chain that are disposed in the plane of the pulley wheel. The intermediate links 25 are arranged to bear on the flat lands 26 provided on the periphery of the pulley wheel between the notches 23. In that way there is no danger of slippage of the chain with respect to the wheel and the chain runs freely over the wheel in the equalization of the sling. The angularity of the lands 26 relative to the notches 23, clearly indicated in Fig. 1, is a very important factor in avoiding slippage between the chain and wheel, and the wheel is frictionally locked against turning in accordance with the present invention. There are at least three of the flat lying links 25 and at least four of the other links 24 disposed edgewise relative to the wheel in engagement with the pulley wheel at any given time, and there is, therefore, adequate gripping action to eliminate likelihood of slippage even under heavy load.

The arcuate brake shoes 12 and 13 have upwardly diverging friction brake surfaces 27 provided thereon, and the pulley wheel 14 has outwardly converging friction brake surfaces 28 on the rim portion adapted to fit tightly and wedgingly between the surfaces 27 when the wheel 14 is placed under load compressing the springs 20. The wheel is shown in that position in Figs. 1 and 2 and is thereby held frictionally against turning after the equalization of the sling has occurred. The springs 20, in other words, resist the downward movement of the pulley wheel enough to allow the equalization to occur, but the wheel is immediately thereafter locked against turning by tight frictional engagement on the brake shoes 12—13. In this wedging engagement of the rim portion of the wheel between the brake shoes, it is obvious that the rim is subjected only to compression loading and there is no danger of breakage. The resulting tendency to spread the brake shoes means that a tension load is placed on the bolts 10, but this loading is well within the capacity of these bolts to withstand, so that there is no danger of any stripping of threads on the nuts that are applied to these bolts. The arrangement of the wheel 14 with relation to the brake shoes 12 and 13 insures centering of the wheel midway between the side plates 8 and 9 in each operation of the sling, as should be clear from inspection of Fig. 2, so that there is no danger of the wheel or links of the chain thereon rubbing on the inner sides of the side plates 8 and 9 in the operation of the sling. Furthermore, the brake shoes are completely independent of the chain receiving groove 22—23, so that no limitations are placed upon the design thereof by said shoes.

Figure 4:
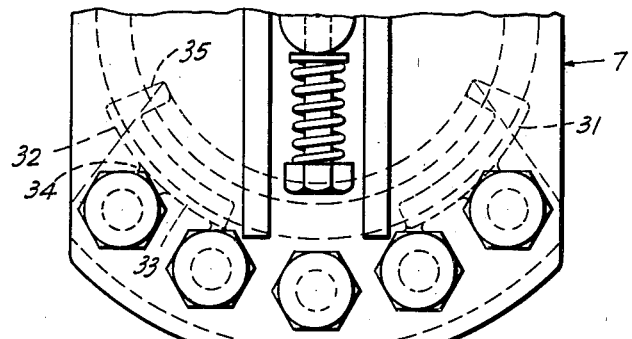
Fig. 4 is a side view of the lower portion of Fig. 3 showing in dotted lines the relationship of the cable guides to one another.
Figure 3:
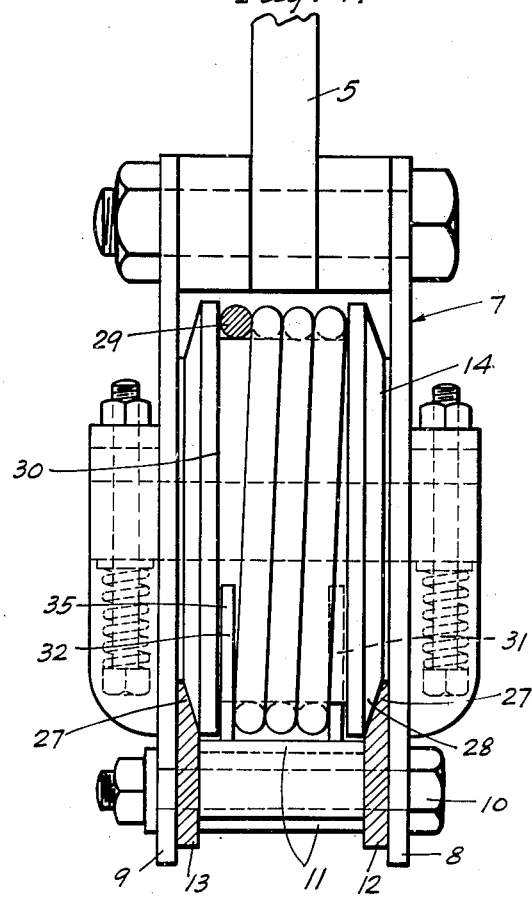
Fig. 3 is a view similar to Fig. 2 showing a cable type sling.

The sling 7', shown in Figs. 3 and 4, is of similar construction but is designed to operate with a steel cable 29, the pulley wheel 14' having an annularly recessed rim portion 30 to accommodate four turns of the cable, as indicated, in order to afford sufficient frictional grip for the cable on the wheel to avoid likelihood of slippage when the wheel is frictionally locked against turning. The annularly beveled edge portions 28' of the rim of the wheel cooperate with the diverging friction brake surfaces 27' on the friction shoes plates 12' and 13', similarly as in the other sling. In this sling, however, the spacers 11' in addition to spacing the brake shoe plates 12' and 13' and side plates 8' and 9' serve as supports for cable guide members 31 and 32, which are of elongated form, each having an arcuate attaching portion 33 welded, as indicated at 34, to two adjacent spacers and having an upwardly bent end portion 35 serving as a cable guide finger to ride against the side of the cable on the lower side of the pulley wheel, to keep it spaced the correct distance from the side of the recess 30. In that way there is never any danger of the cable shifting its position relative to the pulley wheel recess 30 and possibly becoming jammed between the wheel and side plates or between the wheel and the suspension eye 5'. Here again, it is clear that with the present construction the brake shoes are completely independent of the cable and, consequently, there is no problem of interference, as in the earlier patented design.

It is believed that the foregoing description conveys a good understanding of the objects and advantages of my invention. The appended claim has been drawn to cover all legitimate modifications and adaptations.

I claim:

A sling of the class described comprising a load carrying frame consisting of spaced side members, a pulley wheel rotatably mounted between said side members and movable bodily downwardly relative to said side members under load, spring means resisting downward movement of said wheel, a single continuous length of flexible load carrying element extending over the top of said pulley and arranged to be attached at its opposite ends to the load to be lifted, said wheel having an outwardly tapered form at its periphery, arcuate brake shoes disposed on opposite sides of said wheel below the same and between the side members of said frame and having upwardly diverging surfaces between which the tapered portion of said wheel is adapted to have a wedging frictional braking contact, spacer sleeves between said shoes to maintain the same in a fixed spaced relation, and through bolts entered through holes provided in the side members of said frame and registering holes provided in said shoes and extending through said spacing sleeves to prevent separation of said side members and brake shoes.

LESLIE M. CALDWELL.

REFERENCES CITED

The following references are of record in the file of this patent:

UNITED STATES PATENTS

| Number | Name | Date |
|---|---|---|
| 845,506 | Bardwell | Feb. 26, 1907 |
| 1,976,267 | O'Connor | Oct. 9, 1934 |
| 2,135,796 | Carnes | Nov. 8, 1938 |
| 2,243,361 | Stahl | May 27, 1941 |
| 2,356,147 | Caldwell | Aug. 22, 1944 |

FOREIGN PATENTS

| Number | Country | Date |
|---|---|---|
| 395,302 | Germany | May 7, 1924 |